US011267212B2

(12) United States Patent
Pflug

(10) Patent No.: US 11,267,212 B2
(45) Date of Patent: Mar. 8, 2022

(54) HONEYCOMB CORE WITH HIERARCHICAL CELLULAR STRUCTURE

(71) Applicant: ECONCORE N.V., Leuven (BE)

(72) Inventor: Jochen Pflug, Wiesbaden (DE)

(73) Assignee: ECONCORE N.V., Leuven (BE)

( * ) Notice: Subject to any disclaimer, the term of this patent is extended or adjusted under 35 U.S.C. 154(b) by 622 days.

(21) Appl. No.: 15/572,477

(22) PCT Filed: May 21, 2015

(86) PCT No.: PCT/EP2015/061299
§ 371 (c)(1),
(2) Date: Nov. 7, 2017

(87) PCT Pub. No.: WO2016/184528
PCT Pub. Date: Nov. 24, 2016

(65) Prior Publication Data
US 2018/0126680 A1    May 10, 2018

(51) Int. Cl.
*B29D 24/00* (2006.01)
*B29D 99/00* (2010.01)
*B31D 3/02* (2006.01)

(52) U.S. Cl.
CPC ......... *B29D 24/005* (2013.01); *B29D 24/008* (2013.01); *B29D 99/0089* (2013.01);
(Continued)

(58) Field of Classification Search
CPC ............. Y10T 428/234; Y10T 428/236; Y10T 428/24; Y10T 428/24149;
(Continued)

(56) References Cited

U.S. PATENT DOCUMENTS

| 5,714,226 A | 2/1998 | Disselbeck |
| 6,387,200 B1 * | 5/2002 | Ashmead ............... B29C 44/186 |
| | | 428/117 |

(Continued)

FOREIGN PATENT DOCUMENTS

| EP | 1824667 B1 | 7/2010 |
| FR | 1485042 A * | 6/1967 ............... B32B 3/12 |

(Continued)

OTHER PUBLICATIONS

[NPL-1] Hexcel Products Inc. (FR 1485042 A), (EPO machine translation to English). (Year: 1967).*

(Continued)

*Primary Examiner* — David Sample
*Assistant Examiner* — Donald M Flores, Jr.
(74) *Attorney, Agent, or Firm* — Hamre, Schumann, Mueller & Larson, P.C.

(57) ABSTRACT

A hierarchical sandwich core in the form of a honeycomb, i.e. having repetitive and periodic lattice materials. The sandwich core can be made up of a macroscopic honeycomb structure with sandwich cell walls having a mesoscopic cellular core. The longitudinal axis of cells of the mesoscopic honeycomb cell can be perpendicular to the longitudinal axis of the cells of the macroscopic honeycomb structure. Alternatively, if a foam core is used having mesoscopic cells the shape of the mesoscopic cells can be made during the foaming process so that they are elongate in a direction perpendicular to the longitudinal axis of the cells of the macroscopic honeycomb structure.

18 Claims, 7 Drawing Sheets

(52) U.S. Cl.
CPC ......... *B31D 3/0223* (2013.01); *Y10T 428/234* (2015.01); *Y10T 428/236* (2015.01); *Y10T 428/24* (2015.01); *Y10T 428/24149* (2015.01); *Y10T 428/24165* (2015.01); *Y10T 428/24174* (2015.01); *Y10T 428/24273* (2015.01); *Y10T 428/24281* (2015.01); *Y10T 428/24289* (2015.01); *Y10T 428/24298* (2015.01); *Y10T 428/24306* (2015.01); *Y10T 428/24314* (2015.01); *Y10T 428/24322* (2015.01)

(58) Field of Classification Search
CPC ..... Y10T 428/24165; Y10T 428/24174; Y10T 428/24273; Y10T 428/24281; Y10T 428/24289; Y10T 428/24298; Y10T 428/24306; Y10T 428/24314; Y10T 428/24322; B29D 24/005; B29D 24/008; B29D 99/0089; B29D 24/00; B31D 3/0223; B31D 3/02
USPC ....... 428/72, 73, 98, 116, 118, 119, 131–137
See application file for complete search history.

(56) References Cited

U.S. PATENT DOCUMENTS

| | | | |
|---|---|---|---|
| 6,673,415 B1 * | 1/2004 | Yamazaki | .................. B32B 3/12 428/117 |
| 8,795,806 B2 | 8/2014 | Pflug et al. | |

FOREIGN PATENT DOCUMENTS

| | | |
|---|---|---|
| FR | 1485042 A | 6/1967 |
| JP | S50114923 U | 9/1975 |
| JP | S63101607 U | 7/1988 |
| JP | H0550169 A | 3/1993 |
| JP | H05169170 A | 7/1993 |
| JP | H05185168 A | 7/1993 |
| JP | H0728631 U | 5/1995 |
| JP | 4368399 B2 | 11/2009 |
| RU | 2067950 C1 | 10/1996 |
| RU | 2084349 C1 | 2/1997 |
| RU | 81510 U1 | 3/2009 |
| WO | 2006/053407 A1 | 5/2006 |
| WO | 2011/082708 A1 | 7/2011 |
| WO | WO-2011082708 A1 * | 7/2011 ............. B31D 3/023 |
| WO | 2013/153326 A1 | 10/2013 |

OTHER PUBLICATIONS

[NPL-2] Britzke (WO 2011/082708 A1), (EPO machine translation to English). (Year: 2011).*
[NPL-3] Ajdari, A. et al.; "Hierarchical honeycombs with tailorable properties". Int. J. Solids Struct., (Jun. 1, 2012), vol. 49, Iss. 11-12, pp. 1413-1419. (Year: 2012).*
[NPL-4] Yi, T.; "Mechanical properties of a hierarchical honeycomb with sandwich walls". Proc. IMechE Part C: J. Mechanical Engineering Science, (2016), vol. 230, Iss. 16, pp. 2765-2775. (Year: 2016).*
Chinese Office Action in Corresponding Chinese Application No. 201580080219.X, dated May 31, 2019.
Russian Office Action in related Russian Application No. 2017140507, dated Sep. 26, 2018.
European Office Action in corresponding European Application No. 15727905.0-1019, dated Nov. 22, 2019.
Japanese Office Action in Corresponding Japanese Application No. 2018-512479, dated Apr. 2, 2019.
International Search Report (ISR) dated Feb. 4, 2016, for PCT/EP2015/061299.
Written Opinion dated Feb. 4, 2016, for PCT/EP2015/061299.
International Preliminary Report on Patentability (IPRP) dated Jul. 17, 2017, for PCT/EP2015/061299.
Indonesia Office Action in corresponding Indonesia Application No. PID201709031, dated Feb. 20, 2020.
Chinese Office Action in corresponding Chinese Application No. 201580080219.X, dated Mar. 26, 2020.
Yang Wei Ping Bian, Guidelines for Finite Element Modeling of Aircraft Structures, Aviation Industry Press Aircraft Design Technology Series, May 1, 2013, 5 pages, English Abstract.
Indonesia Office Action in corresponding Indonesia Application No. PID201709031, dated Sep. 21, 2020.

* cited by examiner

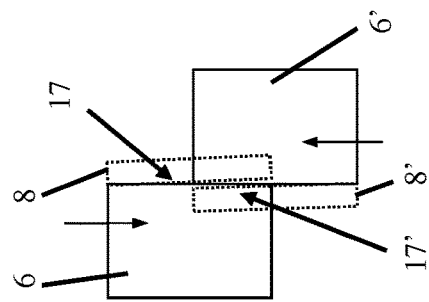
Figure 3A
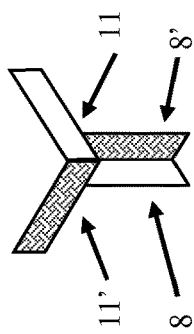
Figure 3B
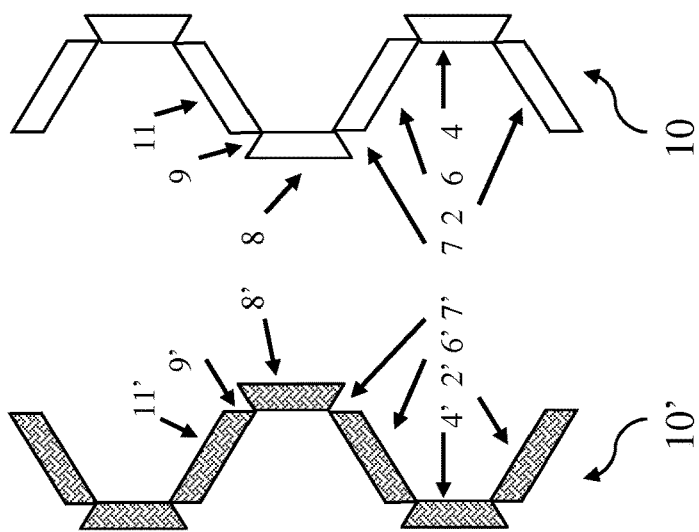
Figure 2A
Figure 2B
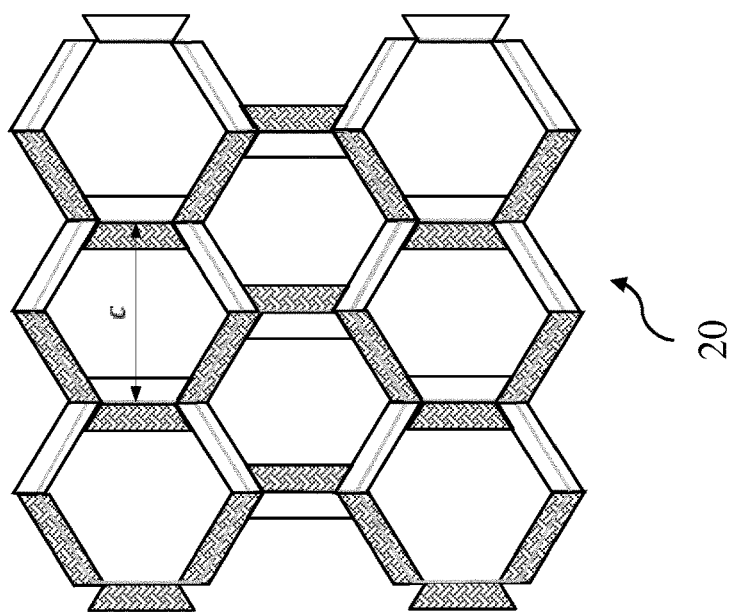
Figure 2C
Figure 2

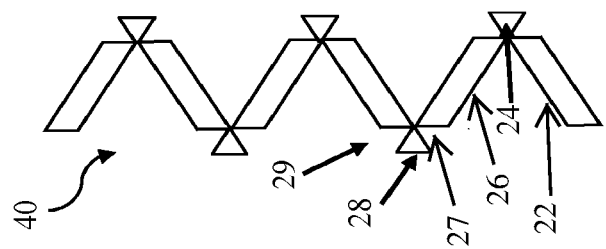
Figure 6A
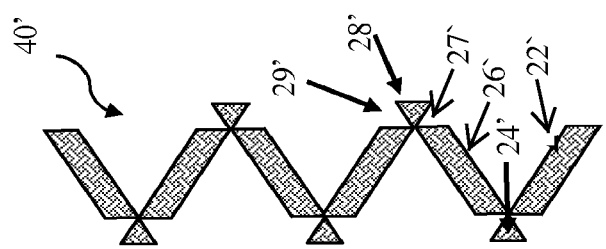
Figure 6B
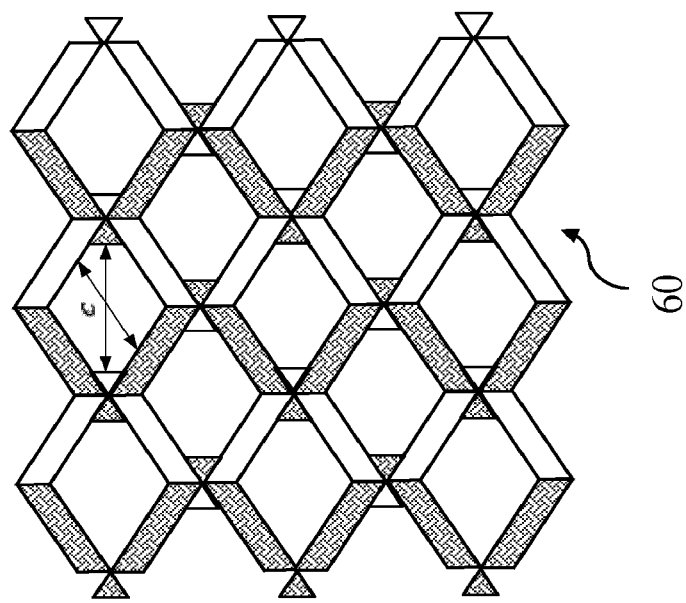
Figure 6C
Figure 6

HONEYCOMB CORE WITH HIERARCHICAL CELLULAR STRUCTURE

The present invention relates to sandwich core materials and methods of making sandwich core materials that include honeycomb cores or cellular structures similar to honeycomb cores. Such cores can be used in sandwich panel materials for many different applications to enable high bending stiffness and strength at minimal weight for example in automotive, transportation, building and packaging applications or rainwater management or gravel stabilization applications.

BACKGROUND OF THE INVENTION

A core being sandwiched between two thin facing sheets or skins is frequently used to produce stiff and lightweight panels. Foam cores and honeycomb cores sometimes called periodic lattice materials are two broad classes of core which can be employed in sandwich construction.

Foams can be closed or open cell. Foams possess limited specific stiffness and strength in each direction. In contrast, honeycomb materials have better specific stiffness and strength in out-of-plane direction.

Hexagonal honeycombs are extensively used in sandwich constructions due to their high specific stiffness and strength in out-of-plane compression and in out-of-plane shear performance. However honeycomb cores with a very low density need to have very thin cell walls. These thin cell walls tend to buckle under the out-of-plane compression and shear loads so that a small cell size is required, but a smaller cell size leads to higher density and weight.

Furthermore, honeycomb cores can be limited in size due to limitations in the size of the production equipment. Continuous production processes have been developed to enable a cost efficient production of honeycomb cores with variable length. For a larger width higher investments have to be considered or core sheets have to be combined together.

Expandable honeycombs are known with which the final honeycomb geometry is obtained by pulling the collapsed structure laterally, e.g. expandable aluminium honeycombs. The nodes of the structure of expandable honeycombs allow rotation of the strips which form the cells walls so that an expanded honeycomb can be flattened. To stabilize aramid paper based expanded honeycombs they are dipped into resin which is cured while the honeycomb is hold in the expanded shape. Thermoplastic expanded honeycombs have to be heat treated to relax the stresses imposed by the expansion process.

Slotted honeycomb cores made from thin solid cell walls are known, such as from paper material. These may be made of slotted strips of material which can be slotted together to form nodes that allow rotation of the strip material during expansion. The nodes do not prevent the deformation of the cells.

The conventional production processes of honeycomb cores, by expansion or corrugation do not work well if the cell walls are rather thick.

SUMMARY OF THE INVENTION

It is the object of the present invention to provide a product design and a production method which allows cellular structures, e.g. comprising honeycomb cells to have a lower density and thick cell walls. An advantage of embodiments of the present invention is the production of large honeycomb sheet sizes using an economical process and efficient equipment.

In one aspect the present invention provides a hierarchical sandwich core in the form of a honeycomb, i.e. having repetitive and periodic lattice materials. The sandwich core can be made up of a macroscopic periodic lattice material such as a macroscopic honeycomb structure with sandwich cell walls having a mesoscopic cellular core. The mesoscopic cellular core can be for example, a foam or can be made from periodic lattice materials such as a mesoscopic honeycomb structure. In the latter case, in embodiments of the present invention, the longitudinal axis of cells of the mesoscopic honeycomb cell can be perpendicular to the longitudinal axis of the cells of the macroscopic honeycomb structure. In such a case, both the mesoscopic cells and the macroscopic cells can be hexagonal or rectangular such as square, for example but the invention includes cells of four or six sides linked together at four or six nodes. Alternatively, if a foam core is used having mesoscopic cells the shape of the mesoscopic cells can be made during the foaming process so that they are elongate in a direction perpendicular to the longitudinal axis of the cells of the macroscopic honeycomb structure.

The thickness of the cell walls at nodes of the macroscopic honeycomb core structure can be selected so that the nodes are locked and the core structure is not collapsible in-plane without local compression/deformation of the sandwich cell walls at the nodes. The locking can be provided in embodiments of the present invention by interlocking-form-fitting components at the nodes of the macroscopic honeycomb structure. In addition a further locking function can be achieved by one or more covering skins of material that can be glued to the core honeycomb on one or more major surfaces of the core, respectively. An advantage of embodiments of the present invention is that rigid e.g. thick cell walls provide improved buckling strength of the cell walls under compression and shear loads. These are higher when the cell walls are sufficiently thick to avoid global buckling.

An advantage of embodiments of the present invention which slit and fold the strips allows rather thick but still very lightweight cell walls.

The thickness of the cell walls can be dependent on many factors, but for large size non-structural panels which need to be optimized for stiffness per weight, a very low density honeycomb core with a large cell size is sufficient. In such embodiments solid cell walls lead to cell walls which can be a factor of 100 or more thinner then the cell size of the macroscopic honeycomb structure, e.g. 0.6 mm cell walls and a cell size of 60 mm. Sandwich cell walls with 5 times or more the thickness can then be lighter and more buckling resistant, e.g. 3-4 mm thick sandwich cell walls with a density of less than $\frac{1}{10}$ of the solid cell wall material.

Any embodiment of the present invention may have cell wall thickness of the macroscopic honeycomb core structure of between 1 and 30 mm, for example in the range 2 to 15 mm, or 3 to 10 mm.

The panel structure is preferably hierarchical in topology: The macroscopic sandwich panel comprises at least one face sheet or skin covering a square or hexagonal honeycomb core having square or hexagonal macroscopic cells in which the longitudinal direction of the macroscopic cells is perpendicular to the skins, with the cell walls of the core made from sandwich panel material with mesoscopic cells such as a foam or square or hexagonal cells. In either case but particularly with reference to the latter case the longitudinal axis of mesoscopic honeycomb cells is preferably perpendicular to the longitudinal axis of the macroscopic honeycomb cells. The present invention also includes mesoscopic or macroscopic cells having four or six sides linked together at four or six nodes. The macroscopic sandwich panel can be produced from the hierarchical macroscopic honeycomb core by lamination of skin layers onto the core.

The hierarchical nature of the core is given by a large size macroscopic square or hexagonal honeycomb made of square or hexagonal cells with cell walls, a diameter of the cells being 5 mm to 50 mm or more, whereas the cell walls incorporate smaller cells described as mesoscopic having a diameter of 0.5 mm up to 5 mm, usually about an order of magnitude smaller and not more than half of the macroscopic cell size.

For example, an aspect of the present invention can be a hierarchical sandwich core having macroscopic honeycomb cells with cell walls made of sandwich panel material with a mesoscopic honeycomb core, the longitudinal axis of the mesoscopic honeycomb cells being perpendicular to the longitudinal axis of the macroscopic honeycomb cells, the sandwich panel cell walls joining each other in form of a repetitive Y-intersection with two arms having a single thickness which will form single thickness cell walls and one arm has a double wall thickness which will form double thickness cell walls of the macroscopic honeycomb. In embodiments the Y structure is stable against lateral collapse of the macroscopic honeycomb structure because the Y structure at it centre has an interlocking-form-fitting latching node.

In an embodiment, the cell walls of the macroscopic honeycomb structure and/or the cell walls of the mesoscopic honeycomb structure can be constructed from a foil or foils such as a polymeric foil or polymeric foils. Other foils may be used such as metal foils, laminates of similar or differing materials, e.g. having a fibrous content. Such foils may have a thickness in the range 20 micron to 400 micron. The polymeric foils can comprise a polyolefin such as polyethylene (e.g. high density or low density polyethylene) or polypropylene or polyamine, polystyrol (polystyrene, foam-like plastic material), polycarbonate or other thermoplastic polymers either alone or in mixtures. Furthermore, metallic foils (e.g. aluminium) and composite layers (with fiber reinforcements) and foil from several layers are included within the scope of the present invention.

In an embodiment, the cell walls of the macroscopic honeycomb core can be made from strips of sandwich panel material with skins on both sides of a core having mesoscopic cells. The strips have first slits which can allow the strips to fold open to form a polygonal chain of convex polyhedra with five or six quadrilateral faces, such as, cuboids linked by remaining parts of the sandwich panel skin material at the slits to form hinges. The strips are articulated in the sense that they comprise rigid or semi-rigid elements (which are the convex polyhedra with five or six quadrilateral faces) able to bend or hinge at predefined points or intervals (i.e. and hinge positions and not at other positions).

The strips have second slits so that only a part of selected hinges are kept intact.

The strips are slotted into each other so that the slits in the hinges of one strip are slotted over the intact part of the hinges of a second strip.

Embodiments of the present invention provide adhesive free slotted macroscopic honeycomb core structures. In embodiments the cell walls are created by the slitting a sheet material, forming the slit sheet into W- or V-shapes structures to be formed into cell wall rows allows the slotting process step without removal of material and is thus leading to a tight fit of the thick cell wall at the connection points. These connection points form nodes of the hexagonal or quadratic honeycomb structure which are interlocking-form-fit nodes.

The chain elements of the polygonal chains can be linked by a continuous connecting foil which forms a hinge between adjacent convex polyhedra with five or six quadrilateral faces such as cuboid chain elements. Alternatively the chains can be linked by a tape which spans the hinge positions, e.g. an adhesive tape. The linked convex polyhedra with five or six quadrilateral faces structures such as cuboid structures are articulated at the hinges. The alternating convex polyhedra with five or six quadrilateral faces such as cuboid structures can include a first convex polyhedra with five or six quadrilateral faces such as a cuboid with top and bottom surfaces in the form of parallelograms and side surfaces that are rectangles.

In accordance with embodiments of the present invention two strips are slotted together to form one row of cells of the macroscopic honeycomb core. In accordance with embodiments of the present invention a cell of the macroscopic honeycomb core can have four or six sides linked together at four or six nodes, respectively, each node being an interlocking-form-fit such that collapse of the cells laterally to flatten the honeycomb is only possible with damage or distortion of the material of the walls.

In one embodiment the chain is made of first convex polyhedra with five or six quadrilateral faces such as cuboids and the macroscopic honeycomb cells formed therefrom are four sided. In this embodiment the structures are linked to form the chain by the continuous connecting skin which forms hinges between adjacent convex polyhedra with five or six quadrilateral faces such as cuboid structures, whereby the link alternates from the top surface to the bottom surface in adjacent first convex polyhedra with five or six quadrilateral faces such as cuboids. A triangular element of one chain interferes with cuboids of a second chain at the node positions to provide interlocking-form-fit nodes.

A second convex polyhedron with six quadrilateral faces such as a cuboid has top and bottom surfaces (long and short sides) in the form of trapezoids and side surfaces that are rectangles. In another embodiment the polygonal chain is formed by alternating first and second convex polyhedra with six quadrilateral faces such as cuboids and the macroscopic honeycomb cells are six-sided, e.g. hexagonal. In this embodiment the structures are linked to form the polygonal chain by the continuous connecting foil which forms hinges between adjacent convex polyhedra with six quadrilateral faces or cuboid structures, the hinges being connected between the ends of the short sides of the trapezoids of the second convex polyhedra with six quadrilateral faces such as cuboids and the ends of the first convex polyhedra with six quadrilateral faces such as cuboids. In this embodiment the link alternates from the top surface to the bottom surface in adjacent first and second convex polyhedra with six quadrilateral faces such as cuboids.

In any of the embodiments a convex polyhedron cell wall elements with five or six quadrilateral faces such as cuboid elements of one chain interfere with convex polyhedra with five or six quadrilateral faces such as cuboids of a second chain at the node positions to provide interlocking-form-fitting nodes.

The macroscopic cells are formed by slotting together many chains. Additional rows of cells are then made by slotting further chains to the structure and repeating this procedure. The slotting is performed by mating an intact piece of connecting foil in a hinge of one chain which slides into a slit in the continuous foil of a hinge of another chain. The mating is done by sliding the slit in the hinge connecting foil of the other chain over the intact piece of connecting foil of the hinge of the one chain or vice versa. Thus each first chain forms the counterpart of two other chains, one on each side of the first chain, except for a chain at an end of the panel. The slotting results in a locking of the chains due to frictional forces preventing the chains coming apart. An advantage of these embodiments is that the strips are held together without any adhesive or a thermal weld or other attachment means of this nature.

Furthermore, the macroscopic cells are held in shape without any coating or heat relaxation.

In embodiments which produce macroscopic hexagonal cells, for example, the slotting process generates a double thickness wall for two out of the six walls of a macroscopic cell. In embodiments which produce macroscopic square cells, the slotting process generates cell walls all of the same thickness.

In another aspect the present invention provides a hierarchical sandwich core with macroscopic honeycomb cells and cell walls made from sandwich panels comprising: Strips of sandwich panel material with skins on both sides of a core having mesoscopic cells.

The strips have first slits which are fold open to form a polygonal chain of convex polyhedra with five or six quadrilateral faces such as cuboids linked by remaining parts of the sandwich panel material at the slits to form hinges.

The strips have second slits at the hinge positions so that only a part of these hinges are kept intact. The strips are slotted into each so that the slits in the hinges of one strip are over the intact part of the hinges of a second strip.

The present invention also includes a method of making a hierarchical sandwich core in the form of a honeycomb, i.e. having repetitive and periodic lattice materials, from a sheet with foils on both sides of a core having mesoscopic cells. The method can comprise:

A first slitting of the sheet to form a chain of convex polyhedra with five or six quadrilateral faces such as cuboids linked by remaining parts of the foils to form hinges. Partially slitting selected hinges of a first and a second chain to form slits and intact pieces of foil in the selected hinges.

Slotting the first chain into the second chain by sliding the slits in the selected hinges of the first chain over the intact foil pieces of hinges of the second chain, and repeating the slitting and slotting steps for further chains to thereby form the macroscopic honeycomb cells.

The present invention also includes equipment for making a hierarchical sandwich core in the form of a honeycomb, i.e. having repetitive and periodic lattice materials.

BRIEF DESCRIPTION OF THE DRAWINGS

FIGS. 2A and 2C show an embodiment of the present invention whereby the sheet of FIG. 4 is bent to form a chain of W shapes and FIG. 2B shows a first chain slotted into a second chain by sliding the slits in selected hinges of the first chain over the intact foil pieces of selected hinges of the second chain followed by further chains slotted into each other to form an assembled hierarchical honeycomb from sandwich cell walls with hexagonal cells.

FIG. 3A shows a detail of two strips of chains of cuboid elements being slotted together according to an embodiment of the present invention. A possible small opening of the slots during the slotting operation is indicated by the dotted lines.

FIG. 3B shows a repetitive and periodic structural motif in the form of a "Y" with one arm of the "Y" having a double thickness according to an embodiment of the present invention.

FIGS. 6A-6C each show a further embodiment of the present invention whereby the sheet of FIG. 5 is bent to form a chain of V shapes and a first chain is slotted into a second chain by sliding slits in the connecting foil of selected hinges of the first chain over the intact foil pieces of selected hinges of the second chain and this is repeated for other chains to form a hierarchical honeycomb structure according to an embodiments of the present invention.

DEFINITIONS

Embodiments of the present invention make use of a chain of 3D-dimensional objects leach linked to the next by a hinge which allows freedom of rotation about an axis that runs transverse the extending chain. These 3D-dimensional objects are wall elements of the macroscopic honeycomb structure linked in an articulated chain. In various embodiments there are three types of chain elements having the following surfaces:

Two rhombi and four rectangular surfaces.

Two trapeziums (or trapezoids) and four rectangular surfaces (note: in USA and Canada a trapezium is usually referred to as a trapezoid).

Figure 5:
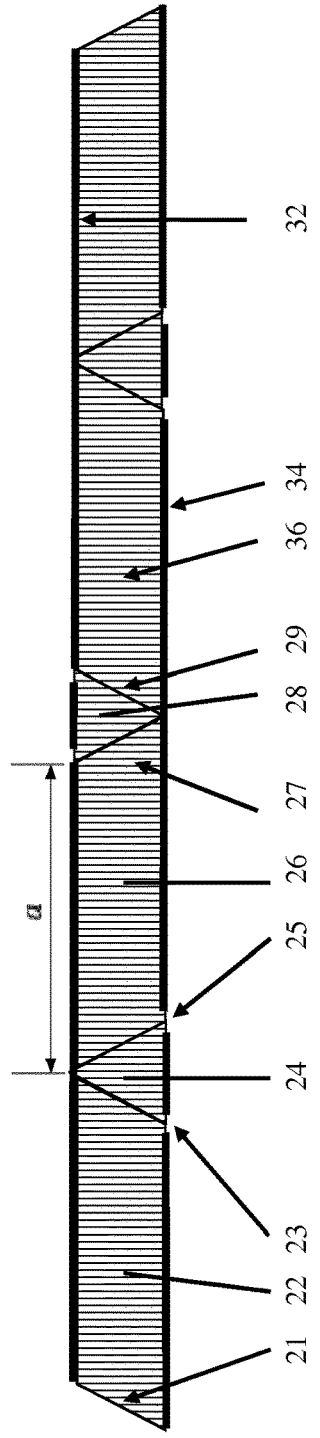
FIG. 5 shows a sheet product that is slit to form an articulated chain of linked cuboids according to another embodiment of the present invention.

Two triangular and three rectangular surfaces (this is where the trapezia shrink to triangles as shown in FIG. 5).

The first two can be described as convex polyhedrons bounded by six quadrilateral faces, i.e. these are cuboids. The trapezoids can be Isosceles trapezoids.

The last one is a right triangular prism which is a three-sided prism; it is a polyhedron made of a triangular base, a translated copy, and 3 faces joining corresponding rectangular sides.

In embodiments of the present invention all the above are described as convex polyhedra with five or six quadrilateral faces.

A "parallelepiped" is a 3D structure formed by six parallelograms. In the present invention a first parallelepiped has top and bottom surfaces (long and short sides) and end surfaces in the form of rectangles and side surfaces that are parallelograms. A second parallelepiped has top and bottom surfaces (long and short sides) and end surfaces in the form of rectangles and side surfaces that are trapezoids.

A "cuboid" is a three-dimensional figure formed with faces having the shape of parallelograms or trapezoids. In a chain of such cuboids the surfaces on the top and the bottom are alternating parallelograms or trapezoids. A cuboid is a convex polyhedron bounded by six quadrilateral faces, whose polyhedral graph is the same as that of a cube. A cuboid of the present invention does not have to have each of the faces being a rectangle nor is it required that each pair of adjacent faces meets in a right angle.

"Macroscopic cells" have a diameter of the cells of 5 mm to 50 mm or more,

"Mesoscopic cells" have a diameter of 0.5 mm to 5 mm.

"Longitudinal axis" of cells means the central axis of a cell that extends parallel to the walls. A cell generally has two distal open ends defined by the walls of the cell. The longitudinal axis exits each cell at the centre of the openings.

The term "articulated" refers a structure able to bend or hinge at certain points or intervals. Thus a chain is composed of links and hinges.

The terms "push fit", "positive push fit", or "held by friction" refer to a connection that can be altered or disconnected by overcoming a frictional force and without damage or distortion of the components. The frictional force may be developed in a particular direction or in one or more directions, for example a straight nail may be removed by extraction only in the direction in which it was hammered in to a substrate.

The term "interlocking-form-fit" refers to a connection that cannot be altered or deformed without damage or distortion of the components in at least one direction. Such a connection can be the type that can allow disconnection or alteration by overcoming friction in one or more directions but in at least one direction this would result in damage or distortion.

The term "push fit latching" refers to making a push fit connection which requires overcoming of a frictional force in the latching direction and also results in an interlocking-form-fit. In the present application one strip of sheet material folded to a multiple "W" or "V" shape is push fit latched to another such strip by slotting the one strip onto the other strip at selected hinge positions. The latching direction is therefore parallel to the plane of the hinge i.e. in a direction through the thickness of the plane of the macroscopic core.

The term "fusion bonded" refers to connections made by welding, brazing, soldering etc. where a material is melted or fused in creating the connection.

The term "adhesive bonded" refers to a connection made by use of an adhesive, a glue or similar.

The "cell size" or "cell diameter" of a honeycomb cell is the distance between two opposing cell walls of a cell. The dimension "c" in FIGS. 2C and 6C are cell diameters.

DETAILED DESCRIPTION OF THE INVENTION

The present invention will be described with reference to certain embodiments and with reference to certain drawings. The drawings are not necessarily to scale but are schematic and are not limiting. The invention is defined more generally in the appended claims. Each dependent claim represents a further embodiment of the present invention.

The present invention relates to articles, comprising a hierarchical sandwich core having a macroscopic honeycomb cells with cell walls made of sandwich panel material with a mesoscopic cellular core. In some embodiments, the mesoscopic cellular structure is made of foam or honeycomb cells. In the latter case the longitudinal axis of the mesoscopic honeycomb cells is preferably perpendicular to the longitudinal axis of the macroscopic honeycomb cells. In some embodiments, the sandwich panel cell walls are joined to each other in the form of a repetitive Y-intersection with two arms of the Y-intersection having single cell walls and one arm having a double wall thickness. The Y-intersection forms a node of a macroscopic honeycomb cell, and the node is an interlocking-form fit such that collapse of the macroscopic honeycomb cells laterally can only happen with destruction or distortion of a cell wall.

Figure 1:
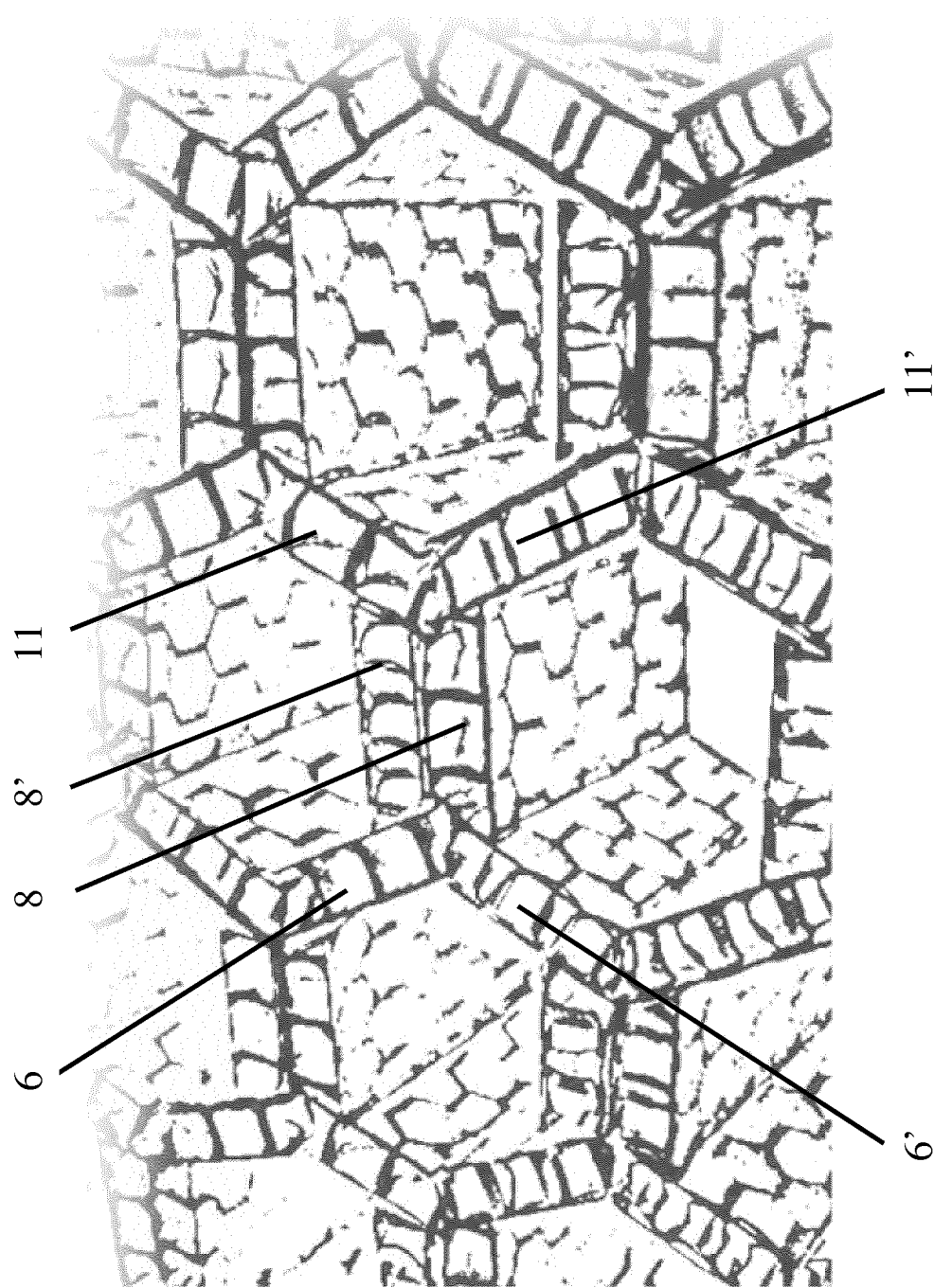
FIG. 1 shows a hexagonal hierarchical honeycomb core with sandwich cell walls with microscopic hexagonal cells.
Figure 4:
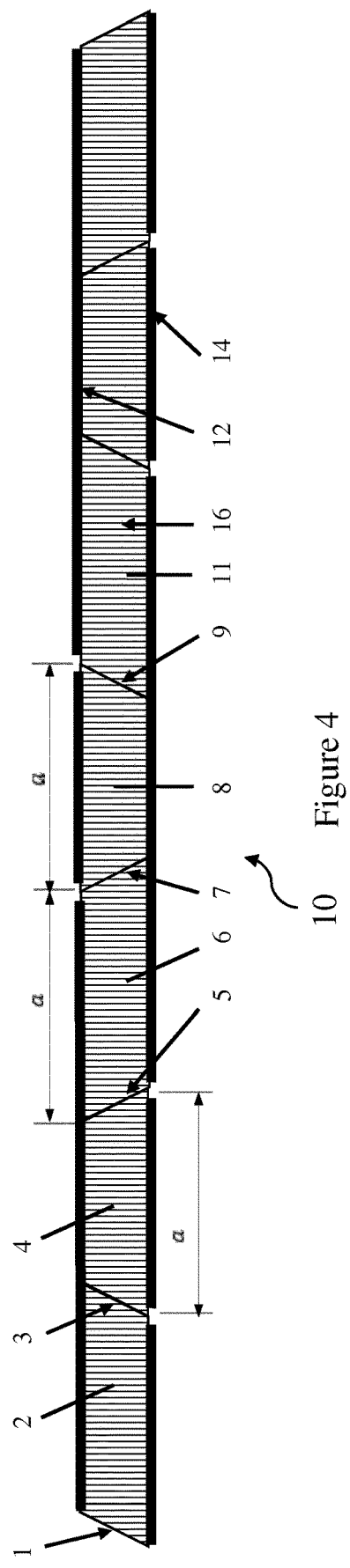
FIG. 4 shows a sheet product that is slit to form an articulated chain of linked cuboids according to an embodiment of the present invention.

A preferred method of forming these sandwich cores starts from a flat sheet 10 of material as shown schematically FIG. 4. FIG. 4 shows a cross-section through the sheet 10 of material which will be used to make the cell walls of the macroscopic honeycomb core. The sheet material 10 is made up of a core 16 of mesoscopic cells (shown as vertical lines) such as of periodic lattice materials, such as six or four sided honeycomb cells, or a foam, the core 16 being sandwiched between two foils 12, 14 which are located respectively on the top and bottom of sheet 10 as shown in FIG. 4. The core 16 of mesoscopic cells (not shown) can include a periodic lattice material such as a sheet of six or four sided honeycomb cells filled with a plastic foam.

The two foils 12, 14 are firmly, e.g. permanently, connected to the core 16 by any suitable means, e.g. by glue, sonic welding, a thermal fusion, etc. The foils 12 and 14 do not need to completely cover the core provided they cover sufficient are to provide mechanical integrity and also cover those parts which will later be hinges.

Sheet 10 can be made for example as a half closed thermoplastic folded honeycomb, whose production process and production equipment is described by Jochen Pflug, Ignaas Verpoest in International publication: WO 2006/053407, European Patent: EP1824667, U.S. Pat. No. 8,795, 806, and Japanese Patent JP4368399.

Initially the sheet 10 is integral and is preferably be stiff or rigid or semi-rigid. The sheet is preferably made of a polymeric material such as a polyolefin, e.g. polyethylene (e.g. high density or low density polyethylene) or polypropylene, impact resistant polypropylene or polyamine, polystyrol (polystyrene, foam-like plastic material), polycarbonate or other thermoplastic polymers. Optionally, such a material may be a rigid plastic having a modulus of elasticity either in flexure or in tension greater than 700 MPa at 23° C. and 50% humidity, when tested in accordance with ASTM methods D747, D790, D 638, or D 882 (see Compilation of ASTM standard definitions, Fourth Edition 1979 for standards valid at that date). Optionally, such a material may be a semi-rigid plastic having a modulus of elasticity either in flexure or in tension between 70 and 700 MPa at 23° C. and 50% humidity, when tested in accordance with an ASTM method such as D747, D790, D 638, or D 882 (see Compilation of ASTM standard definitions, Fourth Edition 1979 for standards valid at that date). Suitable international standards may be used, e.g. DIN, EN, ISO or ASTM method, where they are shown to be equivalent. Generally ISO 527-1 and 5272 are considered equivalent to ASTM D638 for tensile modulus. ISO 178 1993 is considered equivalent to ASTM D790 for flexural modulus. Furthermore, metal foils (e.g. aluminium) and composite layers (e.g. with fiber reinforcements) are included within the scope of this invention.

Any foil used in the manufacture of sheet 10 may be made from one or several layers, e.g. laminates. The polymeric material used may be chemically or physically cross-linked or may be cross-linked after completion of the core, e.g. by electron radiation.

The sheet 10 is then cut, sliced, diced, gauged, sawn or by other means of subtractive machining to divide material or remove material therefrom at an angle and partially through the thickness of sheet 10 to form slits 1, 3, 5, 7, 9 hence, to form a polygonal chain of articulated convex polyhedra with five or six quadrilateral faces such as cuboids 2, 4, 6, 8 linked by remaining parts of a covering foil 12, and/or 14 at the slits to form hinges. For example, with reference to FIGS. 4, 2 and 7A, steps of method 100 are shown. In step 101 a continuously produced sandwich panel or sheet 10 is crosswise slit to form a polygonal chain of convex polyhedra with six quadrilateral faces such as cuboids 2, 4, 6, 8 linked by remaining parts of a covering foil 12, 14 at the slits to form hinges.

The partially cut sheet 10 has for example two parallel slits 1 and 3 at about 30 to 40° to the vertical as seen in FIG. 4, or for example an angle in the range 25 to 50°. The slits 1 and 3 form the left and right boundaries, respectively of a first cuboid chain element 2.

The sides of element 2 have the form of a parallelogram whereas the top and bottom and end surfaces have the shape of rectangles. The rectangles could be squares. The slit 3 is open at the bottom as seen in the FIG. 4, i.e. cuts through cover foil 14. Slits 3 and 5 are the borders of a further chain element 4 adjacent to element 2. Element 4 has the side shape of a trapezium whereas the top and bottom surfaces and the end surfaces have the shape of rectangles. The rectangles could be squares. As shown in FIG. 4, the element 4 has side surfaces whereby the short side of the trapezium is at the top. The slit 5 is open at the bottom, i.e. cuts through cover foil 14. Slits 5 and 7 are the borders of a further chain element 6 adjacent to element 4. Element 6 has the side shape of a parallelogram whereas the top and bottom surfaces and end surfaces have the shape of rectangles. The rectangles could be squares. The element 6 differs from element 2 in that the angle of slope of slits 5 and 7 are the opposite inclination to the vertical as slits 1 and 3. Slit 7 is open at the top, i.e. cuts through cover foil 12. Slits 7 and 9 are the borders of a further chain element 8 adjacent to element 6. Element 8 has the side shape of a trapezium whereas the top and bottom surfaces and end surfaces have the shape of rectangles. The rectangles could be squares. The element 8 differs from element 4 in that the short side of the trapezium is on the bottom. Slit 9 is open at the top, i.e. cuts through cover foil 12. The elements 2, 4, 6, 8 are repeated along the length of the sheet 10. The sheet 10 is processed by slitting as described above until the required width of sheet 10 has been machined. Then, with reference to FIG. 7A in step 102 the slit sandwich panel or sheet 10 can be lengthwise cut into strips 15 of polygonal chains of sandwich panel cuboids.

Although the above process has involved partial slitting through a sheet 10, the same chain of elements can be achieved by slitting all the way through and then joining the elements together with an adhesive foil at each hinge position to thereby recreate the chain.

The process so far has generated a sequence of relatively rigid or semi-rigid cuboid elements linked by hinges whereby the connection point of one element to the next which forms the hinge, alternates from the top to the bottom of the elements (in the sense shown in FIG. 4). This allows the chain of elements to be rotated or folded into a "W" form as shown in FIGS. 2A and 2B. Thus the chain comprises a series of articulated elements. FIG. 2B has elements 2', 4', 6' and 8' with slits 1', 3', 5, 7', 9'. For a longer chain the "W" form is repeated. For example, with reference to FIG. 7A, in step 103, strips 15 of chains of cuboids are folded to form polygonal half-hexagonal shaped strips by holding and moving closer together every fourth cuboid.

Two chains with W forms as shown in FIGS. 2A and 2B are then slotted together to form a macroscopic honeycomb structure 20 as shown in FIG. 2C.

Either end of the structure 20 can be extended by slotting chains shown in FIG. 2A or 2D to the respective end of the structure 20. To explain the slotting procedure, the hinges formed by slits 7 and 9 in FIG. 2A are slit from the bottom up to about 50% of the height of the hinge as shown in FIG. 3A, i.e. the slitting of the hinge is not complete such as to sever from the chain), to form half slits 17 (shown in FIG. 3A) and 19 whereas the hinges 7' and 9' in FIG. 2B are slit from the top down as shown in FIG. 3A to form slits 17' (shown in FIG. 3A) and 19'. For example, with reference to FIG. 7A, in step 104, a second crosswise slitting can be performed so that only a part of the hinges are kept intact by pressing the shaped strip into knife blades. This allows the two chains 10 and 10' to be slotted together with the common cell wall between chain shown in FIG. 2A and the chain shown in FIG. 2B being a double thickness of elements 8 and 8'. For example, with reference to FIG. 7A, in step 104, the strips are slotted into each other so that the slits in the hinges of one strip are slotted over the intact part of the hinges of a second strip.

FIG. 3B shows a node of the macroscopic core. The node is formed by the centre of the Y-intersection where the surfaces of pairs of four chain elements 8, 8', 11, 11' about each other so as to produce an interlocking-form-fit node. Collapse of this structure laterally to collapse the honeycomb would lead to destruction or distortion of the wall elements. Chain element 8 of chain 10 is latched as a push fit onto chain 10'. Chain 10 forms in general the cells which would be on the right of FIG. 3B whereas chain 10' forms in general the cells which would be on the left of FIG. 3B. Element 8 is latched into a cell which would be on the left of FIG. 3B and element 8' is latched into a cell on the right. For the macroscopic honeycomb 20 to collapse laterally the abutting surfaces of the four chain elements 8, 8', 11, 11' must be distorted or crushed.

Figure 7A:
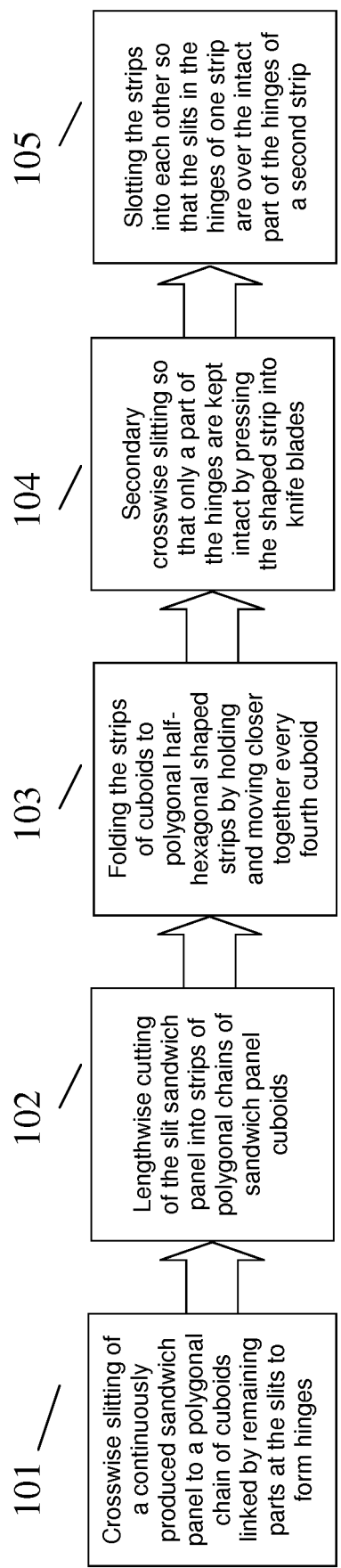
FIG. 7A is a schematic representation of a flow diagram of a method to make honeycomb structures according to an embodiment of the present invention.
Figure 7B:
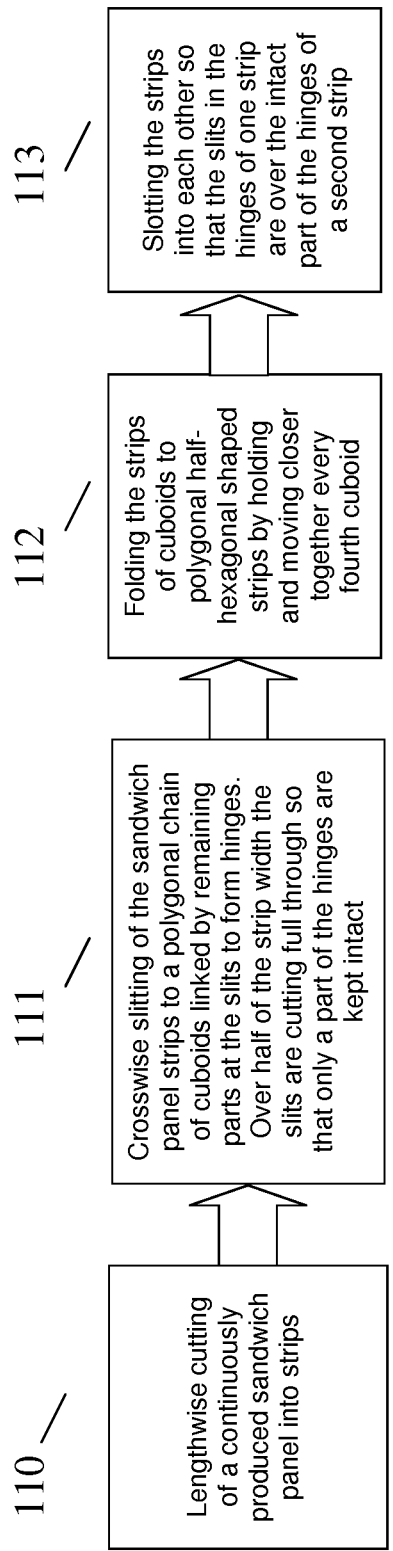
FIG. 7B is a schematic representation of a flow diagram of a further method to make honeycomb structures according to an embodiment of the present invention.

A flow diagram of alternative method 100 which is an embodiment of the present invention is shown in FIG. 7B. In this embodiment, a single slitting operation is performed to create the chain of cuboid elements while at the same time partially slitting through hinges to allow slotting of one chain to another. In step 110, a continuously produced sandwich panel or sheet is lengthwise cut into strips. In step 111, the sandwich panel strips are crosswise slit to form a polygonal chain of cuboids linked by remaining parts of a cover skin at the slits form hinges. In the same slitting operation, the slits are cut full through over a half of the strip width so that only parts of the hinges are kept intact. In step 112, the strips of cuboids are folded to polygonal half-hexagonal shaped strips by holding and moving closer together every fourth cuboid. In step 113, the strips are slotted into each other so that the slits in the hinges of one strip slot over the intact part of the hinges of a second strip.

Yet further alternative methods of joining chains to form the macroscopic honeycomb structure are included within the scope of the invention. For example, adhesive or glue can be used between mating surfaces of elements 8 and 8' (not shown) or ultrasound welding can be applied. Adhesive or glue has the disadvantages that the glue or adhesive has to be applied in a separate processing step and it can spread to unwanted places. Also the developing macroscopic honeycomb needs to be held in place until the glue hardens. Preferred plastic materials for the outer foils 12 and 14 can be polyethylene or polypropylene which are not easy to glue due to low energy surfaces. To alter this, a corona or plasma discharge may be considered to increase surface energy but that introduces yet a further processing step. An alternative is to use double sided thermally activated adhesive tape between the mating surfaces of elements 8 and 8'. Thermally activated double sided tapes solve many of the problems associated with normal glues or adhesives, e.g. they do not migrate easily, and they are easy to apply.

Once the macroscopic core has been produced it may be laminated to other foils on one or both of its major surfaces, or to sheets or panels, such a plastic, metal or fibre containing foils or sheets or rigid material layers. Any of these may be glued or adhered or welded to the major surface or surfaces of the macroscopic core. During the lamination of these surface layers or skins of the macroscopic core the glue may also bond the core cell walls additionally together. If the surface layers or skins of the macroscopic core are thermoplastic materials, like thermoplastic sheets or thermoplastic fibre containing composites or nonwoven layers laminated by thermal welding, these will also weld the cell walls of the macroscopic core at the openings of the cells together to calibrate the thickness of the macroscopic core. During this thermal lamination process the microscopic cells at openings of the macroscopic cells could be full closed by molten polymer. To produce a macroscopic core for later lamination with thermoset resin systems a nonwoven layer e.g. from polyethylene terephthalate (PET) can be welded with or without an additional thermoplastic foil to one or both sides of the macroscopic core to enable an improved bonding without a risk of resin penetration into the macroscopic cells nor into the microscopic cells of the cell walls. Such a material could be also used of rainwater management or gravel stabilization applications.

The length of the honeycomb 20 depends on the number of strips that are added in whereas the width is determined by the lengths of the strips.

In the embodiments of the present invention as described with reference to FIG. 2, a hierarchical sandwich core 20 is formed having macroscopic honeycomb cells with cell walls made of sandwich panel or sheet material having a mesoscopic cellular core, the sandwich panel cell walls joining each other in the form of a repetitive Y-intersection with two arms forming single thickness cell walls and one arm having a double wall thickness as shown in FIG. 3B.

If the mesoscopic cellular core is made of a honeycomb of cells the longitudinal axis of the mesoscopic honeycomb cells are preferably perpendicular to the longitudinal axis of the macroscopic honeycomb cells.

A further method invention of forming these sandwich cores in accordance with embodiments of the present invention starts from a flat sheet 40 of material as shown schematically in FIG. 5. FIG. 5 shows a cross-section through the sheet 40 of material which will be used to make the cell walls of the macroscopic honeycomb core as shown in FIG. 6. The sheet material 40 is made up of a core 36 of mesoscopic cells (shown as vertical lines) such as of periodic lattice materials, six or four sided honeycomb cells, or a foam, the core 36 being sandwiched between two foils 32, 34 which are located respectively on the top and bottom of sheet 40 as shown in FIG. 5. The two foils 32, 34 are firmly, e.g. permanently, connected to the core by any suitable means, e.g. by glue, sonic welding, a thermal fusion, etc. The foils 32 and 34 do not need to completely cover the core provided they cover sufficient are to provide mechanical integrity and also cover those parts which will later be hinges.

Initially the sheet 40 is integral and is preferably be stiff or rigid or semi-rigid. The sheet is preferably made of a polymeric material such as a polyolefin, e.g. polyethylene (e.g. high density or low density polyethylene) or polypropylene, impact resistant polypropylene or polyamine, polystyrol (polystyrene, foam-like plastic material), polycarbonate or other thermoplastic polymers. Optionally, such a material may be a rigid plastic having a modulus of elasticity either in flexure or in tension greater than 700 MPa at 23° C. and 50% humidity, when tested in accordance with ASTM methods D747, D790, D 638, or D 882 (see Compilation of ASTM standard definitions, Fourth Edition 1979 for standards valid at that date). Other standards may be used such as DIN, EN, ISO or ASTM methods where they are shown to be equivalent. Optionally, such a material may be a semi-rigid plastic having a modulus of elasticity either in flexure or in tension between 70 and 700 MPa at 23° C. and 50% humidity, when tested in accordance with an ASTM method such as D747, D790, D 638, or D 882 (see Compilation of ASTM standard definitions, Fourth Edition 1979 for standards valid at that date). Other standards may be used such as DIN, EN, ISO or ASTM methods where they are shown to be equivalent. Generally ISO 527-1 and 5272 are considered equivalent to ASTM D638 for tensile modulus. ISO 178 1993 is considered equivalent to ASTM D790 for flexural modulus. Furthermore, metal foils (e.g. aluminium) and composite layers (e.g. with fiber reinforcements) are included within the scope of this invention. Any foil used in the manufacture of sheet 40 may be made from one or several layers, e.g. laminates, The sheet 40 is then cut, sliced, diced, gauged, sawn by other means of subtractive machining to remove material therefrom at an angle and partially through the thickness of sheet 40 to form slits 21, 23, 25, 27, 29 to form a polygonal chain of convex polyhedra with five or six quadrilateral faces such as cuboids 22, 24, 26, 28 linked by remaining parts of a covering foil 32, and/or 34 at the slits to form hinges. For example, with reference to FIGS. 5, 6 and 7a or 7b, the steps of method 100 of either of the embodiments described above with respect to FIGS. 7A and 7B may be used also for this embodiment.

The partially cut sheet 40 has for example two parallel slits 21 and 23 at about 30 to 40° to the vertical as seen in FIG. 5, or for example an angle in the range 25 to 50°. The slits 21 and 23 form the left and right boundaries, respectively of a first cuboid chain element 22. The sides of element 22 have the form of a parallelogram whereas the top and bottom and end surfaces have the shape of rectangles. The rectangles could be squares. The slit 23 is open at the bottom as seen in FIG. 6, i.e. cuts through cover foil 34. Slits 23 and 25 are the borders of a further chain element 24 adjacent to element 22. Element 24 has the form of a triangle when viewed from the side. It has end and bottom surfaces which are rectangular. Slits 25 and 27 are the borders of a further chain element 26 adjacent to element 24. Element 26 has the side shape of a parallelogram whereas the top and bottom surfaces and end surfaces have the shape of rectangles. The rectangles could be squares. The element 26 differs from element 22 in that the angle of slope of slits 25 and 27 are the opposite inclination to the vertical as slits 21 and 23. Slit 27 is open at the top, i.e. cuts through foil 32. Slits 27 and 29 are the borders of a further chain element 28 adjacent to element 26. Element 28 has the side shape of a triangle whereas the bottom and end surfaces have the shape of rectangles. The rectangles could be squares. The element 28 differs from element 24 in that the angle of slope of slits 27 and 29 are the opposite inclination to the vertical as slits 23 and 25 so that an inverted triangle is formed. Slit 29 is open at the top, i.e. cuts through sheet 32.

Although the above process has involved partial slitting through a sheet 40, the same chain of elements can be achieved by slitting all the way through and then joining the elements together with an adhesive foil at each hinge position to thereby recreate the articulated chain.

The process of this embodiment so far has generated a sequence of relatively rigid or semi-rigid convex polyhedra with six quadrilateral faces such as cuboid elements linked by hinges whereby the connection point of one element to the next which forms the hinge alternates from the top to the bottom of the elements (in the sense shown in FIG. 5). This allows the chain of elements to be rotated or folded into a "V" form as shown in FIGS. 6A and 6B. FIG. 6A has elements 22', 24', 26' and 28' with slits 21', 23', 25, 27', 29'. For a longer chain, the V form is repeated.

Two chains with "V" forms as shown in FIGS. 6A and 6B are then slotted together to form a macroscopic honeycomb structure 60 as shown in FIG. 6C.

Either end of the structure 60 can be extended by slotting chains shown in FIG. 6A or 6D to the respective end of the structure 40. To explain the slotting procedure, the hinges formed by slits 27 and 29 in FIG. 6A are slit partially from the bottom up to about 50% of the height of the hinge as shown in FIG. 3A to form slits 27 and 29 whereas the hinges 27' and 29' in FIG. 6B are slit from the top down as shown in FIG. 3A to form slits 27' and 29'. This allows the two chains 40 and 40' to be slotted together. The strips are slotted into each other so that the slits in the hinges of one strip are slotted over the intact part of the hinges of a second strip.

The present invention also includes methods of manufacture and equipment for manufacture of honeycombs according to any of the embodiments of the present invention and especially the methods of FIG. 7A or 7B.

Figure 8:
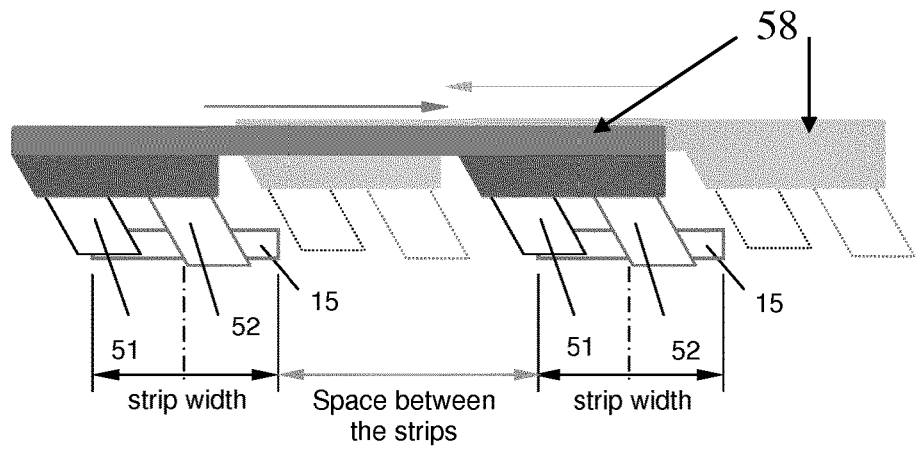
FIG. 8 is an illustration of a knife assembly of equipment according to an embodiment of the present invention.

Equipment to prepare sheet 10 of FIG. 4 or sheet 40 of FIG. 5 is made up of guides for guiding the sheet 10 of FIG. 4 or sheet 40 of FIG. 5 towards cutting equipment (not shown). With reference to FIG. 8 this cutting equipment 50 in accordance with embodiments of the present invention includes one or more slitting tools with first knives 51 held in a tool holder 58 for slitting the strips 15 in thickness so as to generate slits such as 1, 3, 5 etc of FIGS. 4 and 21, 23, 25, etc of FIG. 5. To do this the knives are angled at an angle of theta and theta'. These angles are preferably about 30 to 40°, e.g. in the range 25 to 50°. With reference to FIG. 8, second knives 52 are provided held in a tool holder 58 for slitting the strip hinges created by the first knives to about half in width (i.e. cutting the strips fully over half the strip width). To achieve this, the second knives 52 cut to a lower level than the first knives 51. The knives may have a thickness of, for example, 0.1 mm such as may be the thickness of a razor blade knife up to more substantial knives of a thickness of 1-3 mm for tougher materials.

FIG. 8 shows the slitting tool with a plurality of first knives 51 for slitting several strips 15 in thickness and a plurality of second knives 52 for cutting the strips fully over half the strip width. To achieve this, the second knives 52 cut to a lower level that the first knives 51.

The slitting tools are also provided with oscillators i.e. means for creating an oscillating movement or alternatively rotating knives can be used. Slitting each of the spaced parallel strips with one set of knives allows cutting of the strips fully over half the strip width with the secondary knives 52 at the same time with small amplitudes for the oscillating movement. The small amplitudes of only one strip width, equal to the macroscopic honeycomb core thickness enable a fast slitting operation. The knives may have a thickness of, for example, 0.1 mm such as may be the thickness of a razor blade knife up to more substantial knives of a thickness of 1-3 mm for tougher materials.

Figure 9:
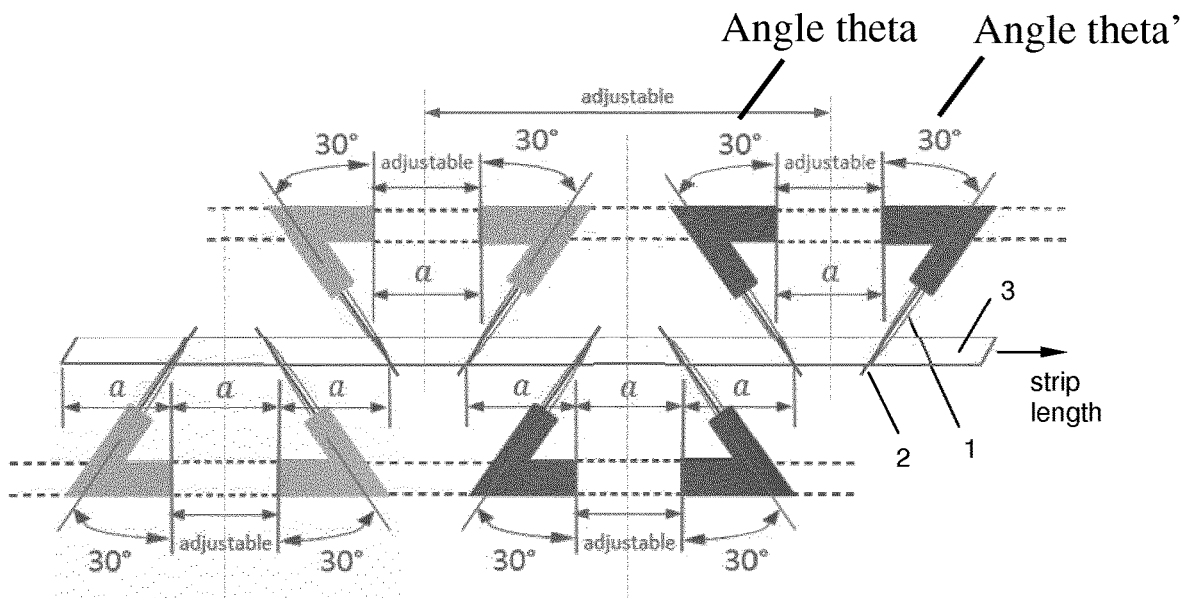
FIG. 9 is an illustration of yet another knife assembly of equipment according to an embodiment of the present invention.
Figure 11:
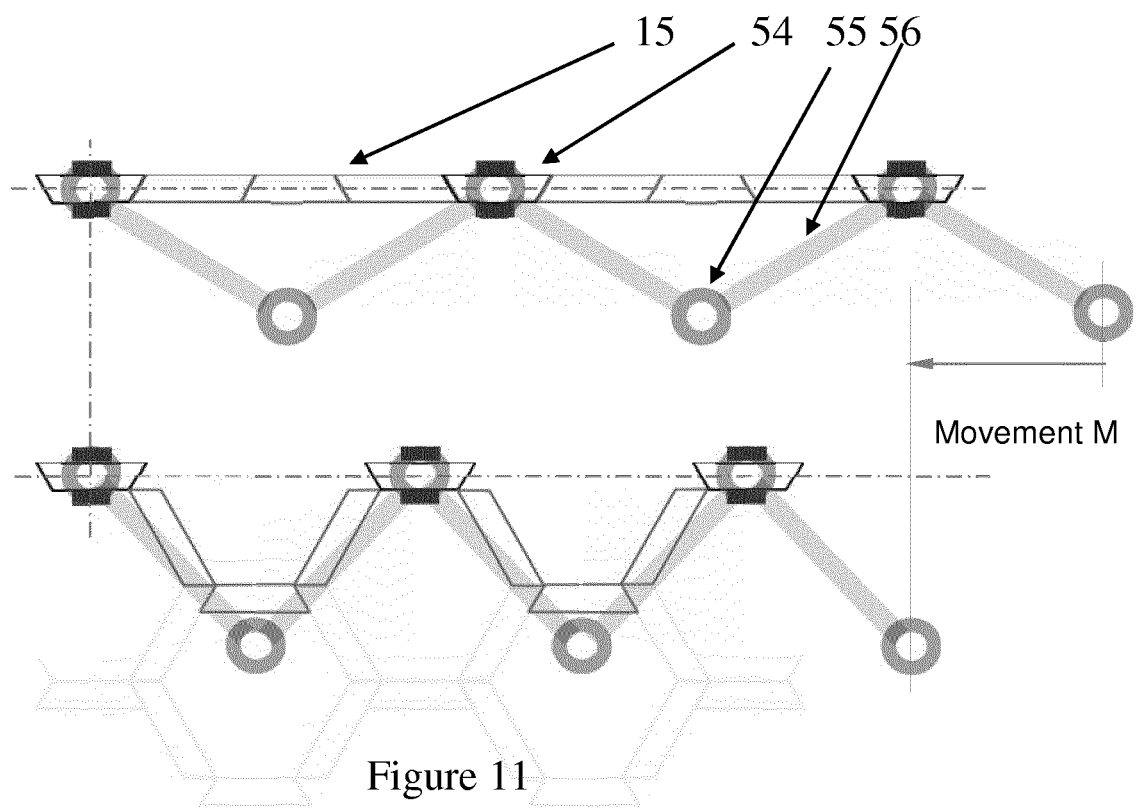
FIG. 11 is an illustration of slotting equipment according to an embodiment of the present invention.

With reference to FIG. 9 several knife pairs can be used in one tool arranged along the length direction of the strips. This allows making several slits over a certain length of the strips 15 during one operation. The lower and upper slits in the strips can be made in the same operation either with the same movement (for slits from the same side) or with a movement from the opposite side (for slits from the opposite side). As shown in FIGS. 9 and 11, the position of the knives 51 and 52, i.e. the distance "a", is preferably made adjustable with respect to the distance between adjacent knives or between sets of knives. Also the angle theta and theta' (see FIG. 9) are preferably made adjustable.

Figure 10:
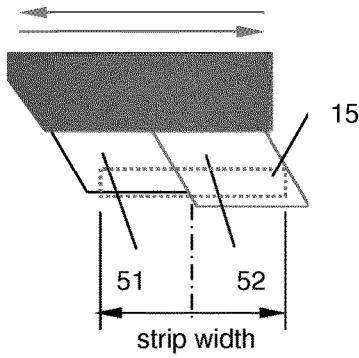
FIG. 10 is an illustration of a knife assembly of equipment according to an embodiment of the present invention.

The knives are preferably sufficiently long so that the ends of the second knives are still fully in the strip when the fronts of the blades of the first knives are through the strips. This will enable a secure sliding back of the knives out of the strips (FIG. 10). The knives may have a thickness of, for example, 0.1 mm such as may be the thickness of a razor blade knife up to more substantial knives of a thickness of 1-3 mm for tougher materials.

Any of the knives 51 and/or 52 can be static, rotating or oscillating knives. The cutting of the strips 15 results in a chain of convex polyhedra with five or six quadrilateral faces such as cuboids connected by hinges.

The equipment is adapted further so that similar convex polyhedra with five or six quadrilateral faces such as cuboids with trapezoid surfaces (every fourth one of the convex polyhedra with five or six quadrilateral faces such as cuboids) are now moved closer together while they stay in one line. By this movement, hinges open and the convex polyhedra with five or six quadrilateral faces such as cuboids form a polygonal chain, with e.g. a half-hexagonal pattern or a zigzag pattern. The distance between each of the convex polyhedra with five or six quadrilateral faces such as cuboids which stay in one line needs to be reduced equally e.g. to about 75%.

With reference to FIG. 11, a mechanism with grips 54, rotation points 55 and moveable arms 56 is used to fold the polygonal chain strip 15 and to position the convex polyhedra with five or six quadrilateral faces such as cuboids so that slotting first and second strips 15 into each other is possible. The slits in the hinges of one strip are moved over the intact part of the hinges of a second strip and aligned therewith. The second strip is hereby already part of the macroscopic honeycomb and thus correctly positioned.

The strips which are already part of the macroscopic honeycomb stay correctly positioned due to the exact fit of the cuboids at the hinges. The folding mechanism 54, 55, 56 collapses in a concertina fashion as shown schematically in FIG. 11 to create the folded "W" form of FIG. 2A or the "V" form of FIG. 6A. A slight tilting of the convex polyhedra with five or six quadrilateral faces such as cuboids will help to ease the finding of the slots. The equipment includes actuators for lowering the second strip onto the first strip so that the half cut slit of one strip slides over the remaining half not cut part of the relevant hinge foil of the other strip as shown schematically in FIG. 3A.

Figure 12:
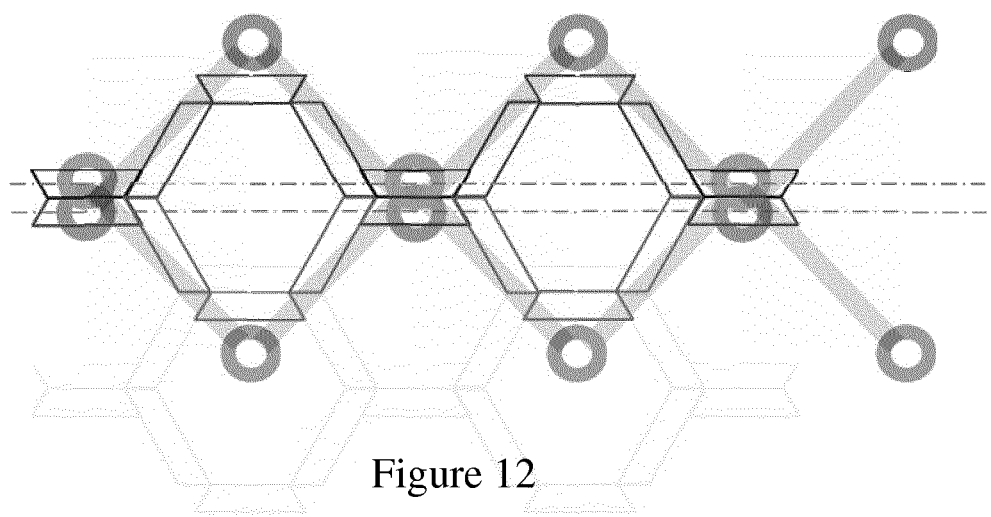
FIG. 12 shows slotting equipment in the closed position according to an embodiment of the present invention.

The length of the strips defines the width of the final hierarchical honeycomb core. The production width of the continuously produced sandwich panel material from which the cell walls are formed does thus not limit the size of the macroscopic honeycomb core. For the production of large width hierarchical honeycombs the equipment may hold the last strip until the next strip is slotted in to ensure the exact position of each hinge. In this case the alternating slotting of the strips from above and below with a mechanism and grips on each side can be used as shown schematically in FIG. 12.

A continuous slotting of the strips allows production of the hierarchical honeycomb according to any of the embodiments of the present invention as a continuous endless web which is moved in large width perpendicular to the production direction of the sandwich panel cell wall material, which can be produced continuously in smaller width. Made from a thermoplastic sandwich cell wall material from thermoplastic foils according to any of the embodiments of the present invention the core can be processed further in-line by laminating a cover sheet to at least one major surface of the core. The cover sheet can be one or more thermoplastic macroscopic skins, or metal, fibre, wood, plastic or composite layers to create second order hierarchical honeycomb sandwich panels.

For example, a hierarchical honeycomb made from plastic foils according to any of the embodiments of the present invention such as a hierarchical honeycomb made from a polypropylene sandwich cell wall material from polypropylene foils can be processed further by laminating one or more cover layers such as PET nonwoven layers to ease the bonding of the macroscopic skin layers. During the lamination the tops of the cell walls can be heated up to a molten state so that the cell walls are welded together and calibrated to a slightly smaller thickness. The larger thickness of the cell walls does allow an easier bonding of the skins compared to traditional honeycomb cores.

The invention claimed is:

1. An article comprising:
a hierarchical honeycomb structure with macroscopic honeycomb cells with cell walls made of sandwich panel material which comprises a mesoscopic cellular core,
the macroscopic honeycomb cells having a hexagonal or rectangular geometry,
the mesoscopic cellular core being made of mesoscopic hexagonal honeycomb cells, a longitudinal axis of the mesoscopic honeycomb cells being perpendicular to a longitudinal axis of the macroscopic honeycomb cells,
wherein cell walls of the mesoscopic cellular core are constructed from a foil or foils, and
wherein the mesoscopic cellular core has two layers of a cover sheet along a top surface and a bottom surface of the mesoscopic cellular core to create the sandwich cell walls.

2. The article of claim 1, wherein the foil is a polymeric foil, a metal foil, a laminate of similar or differing materials, a composite layer having a fibrous content, a foil made of a polyolefin, high density polyethylene or low density polyethylene or polypropylene or polyamine, polystyrene, polycarbonate or other thermoplastic polymer either alone or in mixtures.

3. The article of claim 1, wherein the macroscopic honeycomb cells comprise rigid or semi-rigid elements that are convex polyhedra with five or six quadrilateral faces that are linked by a continuous connecting foil which forms a hinge between adjacent elements that are convex polyhedra with five or six quadrilateral faces.

4. The article of claim 1, wherein the macroscopic honeycomb cells comprise rigid or semi-rigid elements that are convex polyhedra with five or six quadrilateral faces that are linked by a tape which spans hinge positions of the hierarchical honeycomb structure.

5. The article of claim 1, wherein the hexagon or the rectangle is formed of the cells walls of the macroscopic honeycomb cells and four or six nodes, respectively, and the nodes are interlocking-form-fit nodes.

6. The article of claim 1, wherein the macroscopic honeycomb cells comprise elements that are rigid or semi-rigid convex polyhedra with five or six quadrilateral faces that are formed from a first folded chain of elements being convex polyhedra with five or six quadrilateral faces and a second folded chain of elements being convex polyhedra with five or six quadrilateral faces in the form of either "W" or "V" shaped structures and the first folded chain is slotted onto the second folded chain.

7. The article of claim 6, wherein sides of elements of the macroscopic honeycomb cells are in the form of a parallelogram.

8. The article of claim 1, wherein the cell walls of the macroscopic honeycomb cells are arranged in the form of a repetitive Y-intersection with three arms, two of the arms having a single thickness which will form single thickness cell walls and the other one the three arms has a double wall thickness which will form double thickness cell walls of the macroscopic honeycomb cells.

9. The article of claim 8, wherein the one arm having the double wall thickness and forming the double thickness cell walls of the macroscopic honeycomb cells have adhesive or glue or an ultrasound weld or a thermally activated double sided tape between mating surfaces between the cell walls of the double thickness cell walls.

10. The article of claim 1, further comprising a cover sheet applied to at least one major surface of the article.

11. The article of claim 10, wherein the one arm having the double wall thickness and forming the double thickness cell walls of the macroscopic honeycomb cells have adhesive or glue or an ultrasound weld or a thermally activated double sided tape between mating surfaces between the cells walls of the double thickness cell walls.

12. The article of claim 10, wherein the cover sheet can be a thermoplastic material, metal or fibre containing foil or sheet or a rigid material layer.

13. The article of claim 10, wherein the cover sheet comprises a thermoplastic macroscopic skin, or metal, fibre, wood, plastic or composite layer or a PET nonwoven layer, plastic, metal or fibre containing foils or sheets or rigid material layers.

14. The article of claim 13, wherein the cover sheet is glued or adhered or welded to at least one major surface of the macroscopic honeycomb cells.

15. The article of claim 10, wherein the cover sheet is glued or adhered or welded to at least one major surface of the macroscopic honeycomb cells.

16. The article of claim 1, wherein the macroscopic honeycomb cells having a diameter between 5 mm and 50 mm and the mesoscopic honeycomb cells have a diameter between 0.5 and 5 mm.

17. The article of claim 1, wherein cell wall thicknesses of the cell walls of the mesoscopic cellular core is at least 5 times smaller than cell wall thicknesses of the cell walls of the macroscopic honeycomb cells.

18. A hierarchical sandwich core with a macroscopic honeycomb cell structure with hexagonal or rectangular cells and cell walls made from sandwich panels comprising:

strips of sandwich panel material with skins on both sides of a core having a mesoscopic cell structure with hexagonal cells, the strips having first slits which are folded open to form a polygonal chain of elements being convex polyhedra with five or six quadrilateral faces linked by remaining parts of the sandwich panel material at the first slits to form hinges, the strips having second slits so that only a part of the hinges are kept intact, hinges of a first strip being slotted into hinges of a second strip to form the hierarchical sandwich core, wherein cell walls of the mesoscopic cell structure are constructed from a foil or foils, and wherein a longitudinal axis of mesoscopic honeycomb cells forming the mesoscopic cell structure are perpendicular to a longitudinal axis of the macroscopic honeycomb cell structure.

\* \* \* \* \*